July 9, 1940.  W. A. PATSCHEIDER  2,207,067
COMBINED REAMER AND UNDERCUTTER
Filed Jan. 21, 1938
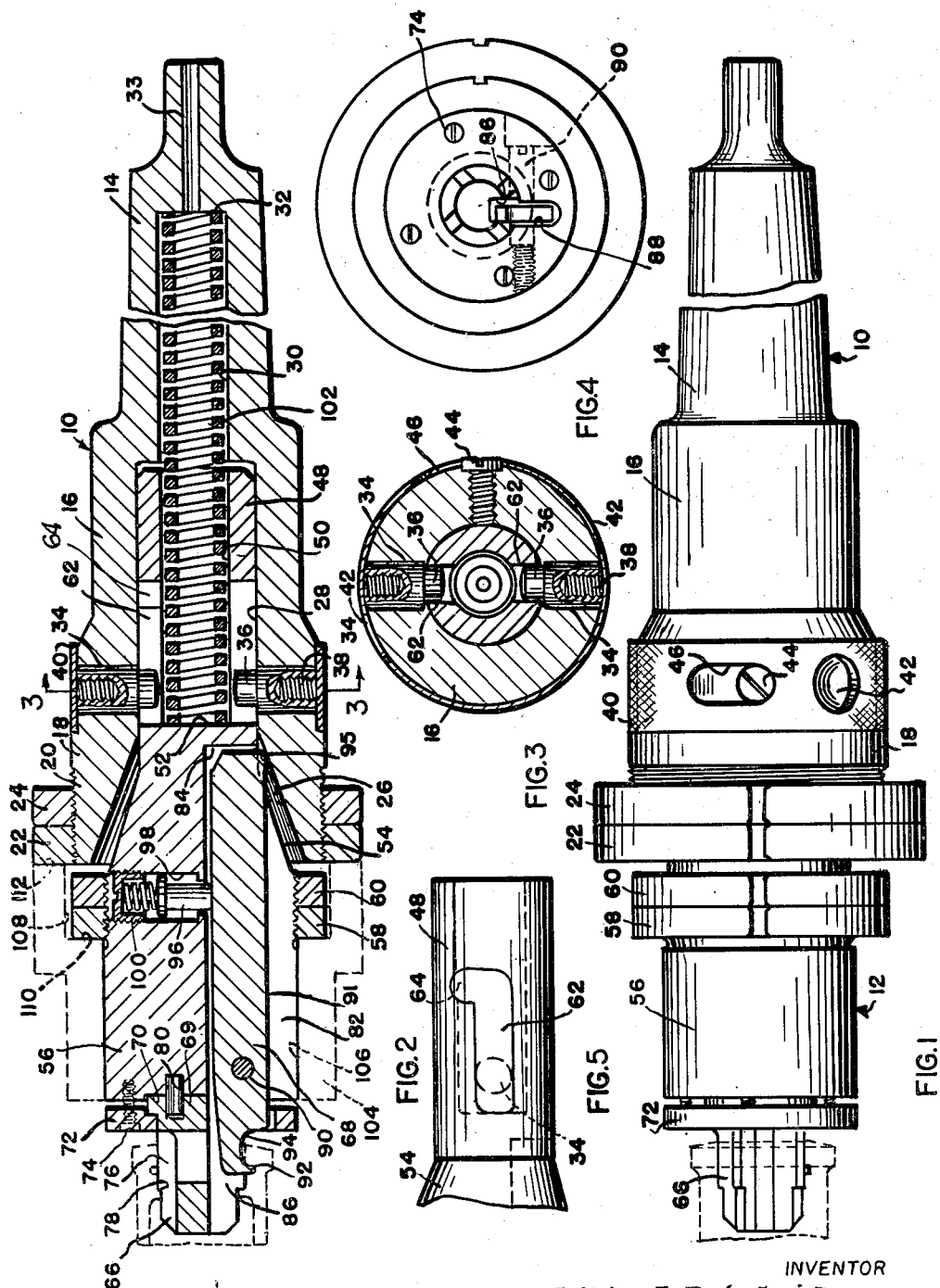
INVENTOR
Walter A. Patscheider
BY Albert J. Henderson
ATTORNEY Patented July 9, 1940

2,207,067

UNITED STATES PATENT OFFICE 2,207,067

COMBINED REAMER AND UNDERCUTTER

Walter A. Patscheider, Auburndale, Mass., assignor to Walworth Patents Inc., Boston, Mass., a corporation of Massachusetts Application January 21, 1938, Serial No. 186,019

5 Claims. (Cl. 77—58)

This invention relates to compound tools, and more particularly to reaming and undercutting tools.

One of the objects of the invention is to construct a tool which, in a single operation, will ream a plurality of internal surfaces of different sizes on a work-piece and undercut a portion of said surfaces.

Another object of the invention is to secure appropriate coordination between the reaming and undercutting operations in order that the tool may function at maximum efficiency.

Another object of the invention is to provide automatic variation between the rate of feed for the reaming and the undercutting operations while utilizing a constant cutting speed therefor.

Another object of the invention is to insure performance of reaming and undercutting operations on a work-piece to definite standards of dimensional accuracy and surface finish.

Another object of the invention is to adapt the tool for operation, either rotating or stationary, according to the type of machine tool with which it is used.

Another object of the invention is to render the cutting elements easily removable for sharpening or replacement.

Another object of the invention is to construct a tool of compact, simple, and durable character which will be economical to manufacture and operate.

Other objects and advantages of the invention will become apparent from the following description taken in connection with the accompanying drawing, wherein:

Fig. 1 is a front elevation of the tool in its closed position at the completion of the cutting operations, Fig. 2 is a longitudinal section through the tool shown in Fig. 1, Fig. 3 is a cross-section taken on the line 3—3 of Fig. 2 and looking in the direction indicated by the arrows, Fig. 4 is an end elevation of the tool shown in Fig. 1 taken from the cutting end, and Fig. 5 is a fragmentary view of a detail.

Referring more particularly to the drawing, the tool is composed principally of two parts, namely the driving shank 10 and the cutting head 12. The driving shank, which will now be described in detail, is provided at one end with a tapered portion 14 conforming to the standard dimension of the machine tool spindle bore with which the tool is to be used. The tapered portion 14 terminates at the larger end by junction with an intermediate cylindrical portion 16, which in turn joins an enlarged end portion 18 at the other end of the shank, all of these parts preferably being integral. The enlarged head portion 18 has a threaded end 20 for the reception of an adjustable stop collar 22 and jamb nut 24. A tapered bore 26 extends axially from the threaded end 20 into the enlarged head 18 before merging into an axial bore 28 which continues into the intermediate portion 16 until it is joined by a smaller bore 30. The bore 30 extends axially of the tapered shank 14 and terminates in a shoulder 32 located adjacent the end thereof. To prevent entrapment of air in any of these bores a small relief aperture 33 may be formed in the shank 14 to connect the bore 30 with the atmosphere.

The unthreaded end of enlarged head portion 18 which is adjacent the intermediate portion 16 is transversely perforated for the reception of stop pins 34. In the present instance there are two diametrically opposite perforations each containing a stop pin 34 although it will be apparent that more or less of these elements could be provided if desired. The stop pins are slidable in the perforations and are provided with reduced end portions 36 projecting into the bore 28. The pins 34 may be provided with suitable means for removing them from their respective perforations such as the threaded axial holes 38 for the reception of a tool.

A knurled retaining ring 40 is slidably fitted on the unthreaded end of the enlarged head portion 18 which may be recessed for its accommodation. This ring 40 serves to prevent the driving pins 34 from being thrown from the perforations due to centrifugal force during the use of the tool and is provided with a pair of diametrically opposite perforations 42 which are made slightly larger in diameter than the retaining pins 34. The pins may be inserted or removed from the enlarged head portion 18 through these perforations 42 by the means previously described.

The ring 40 is secured on the enlarged head portion 18 by means of a headed screw 44 inserted into the enlarged head portion 18 through a slot 46 formed in the retaining ring 40. The head of the screw 44 engages the walls of the slot 46 which is made sufficiently elongated to permit a sufficient degree of rotation of the ring 40 on the enlarged head portion 18 to remove the perforations 42 from alignment with the retaining pins 34. Thus, during use of the tool, the retaining pins are covered by an unperforated portion of the retaining ring 40 and cannot move outwardly from their respective perforations.

The cutting head, designated generally by the numeral 12, comprises a cylindrical shank portion 48 slidable in the bore 28 of the driving shank. The cylindrical portion 48 is provided with an axial bore 50 similar in size to the bore 30 in the driving shank with which it is aligned and terminating in a shoulder 52. The outer periphery of cylindrical portion 48 extends into juncture with an intermediate tapered portion 54 merging into a cylindrical head portion 56 termed the cutting head proper and carrying the various cutting tools to be described.

At the junction of the head 56 and the tapered portion 54 there is provided a threaded portion extending for a short distance along the periphery of the head 56 and adapted for the reception of an adjustable stop collar 58 and jamb nut 60. The cylindrical shank portion 48 is provided with a pair of elongated slots 62 opening into the bore 50 and extending longitudinally from the shoulder 52 substantially midway of the portion 48. The reduced ends 36 of the driving pins 34 extend into the elongated slots 62, thus permitting relative axial, but not rotative, movement of the driving shank and head. Some degree of relative rotative movement between these parts is permitted, however, by the provision of offset portions 64 at the ends of the slots 62 opposite the shoulder 52 and which extend in the direction of rotation of the tool, as shown in Fig. 5.

The tool is equipped with a reamer 66 and undercutting tool 68 which are adapted to operate in sequence on a suitable work-piece. The reamer 66 is provided with an enlarged head 69 engaged within a recess 70 in the face of the cutting head 56 and is secured in abutting relation thereto by means of the collar 72 which engages the head 69 of the reamer and carries set screws 74 inserted into the cutting head. Projecting from the head portion 69 of the reamer is the usual fluted cutting portion 76 which, in this instance, has a stepped portion 78 thereon adapted to form a shoulder on the internal surface of the work-piece. A pin 80 projects from the recessed portion 70 of the head 56 into a suitable perforation in the reamer 66 and serves to locate this cutting tool in desired relationship to the head 56 for a purpose hereinafter described.

The undercutting tool 68, forming the other cutting element of the compound tool, is housed within a slot 82 extending through the cutting head 56 from the front face thereof and terminating in a shoulder 84 adjacent the shoulder 52. A similar slot 86 is formed in the reamer 66 in alignment with the slot 82 and into which the undercutting tool 68 may project. The purpose of the pin 80 is thus to locate the reamer slot 86 in alignment with the slot 82. The collar 72 is also slotted as at 88 but, as shown in Fig. 4, this slot 88 is so arranged as to be offset somewhat from the slots 82 and 86 when the parts are assembled in order to provide a clearance for the undercutting tool 68 at this point. It will be observed, however, that the underside of the tool opposite the cutting edge is supported by the walls of the slots 82 and 86 in the cutting head and reamer respectively.

The undercutting tool is in the form of a relatively thin blade pivoted to the head 56 by means of the pin 90 which is carried by the head 56 and extends transversely through the slot 82 adjacent the front face of the head. The cutting end of the undercutting tool is normally housed within the reamer slot 86 and comprises a somewhat hook-shaped surface formed on one edge 91 of the blade. The so-called hook is formed by a recess 94 extending into the blade from the edge 91 and defining a lip 92 at the extreme end of the blade. The lip 92 has a cutting edge on the front end thereof which may be slightly rounded and is adapted to cut an annular groove on the inner surface of the work-piece at a desired distance inwardly from the outer face thereof. The recessed portion of the hook-shaped end is adapted to clear the inner surface and the outer face of the work-piece when the groove is formed.

The end of the blade opposite the cutting end has a rounded projection 95 which may engage the tapered bore 26 of the driving shank and will ride thereon with a minimum of friction. It will be noted that the distance from the pivot pin 90 to the rounded projection 95 on the blade is about three times the distance from the pin to the cutting end. The cutting end of the undercutting tool 68 normally is retained in a retracted position within the reamer slot 86 by means of a spring plunger 96 housed within a recess 98 extending transversely of the threaded portion of the head 56. The spring plunger 96 extends into the slot 82 in the cutting head 56 and engages the edge of the undercutting tool opposite the edge 91 at a point substantially midway between the rounded projection 95 and pivot pin 90. The spring plunger 96 may be adjusted to position by means of the cap 100 threadedly engaging the walls of the recess 98 and partially enclosing the spring plunger 96.

Normally, the cutting head 12 is urged to an extended position relative to the driving shank 14, by means of a coil spring 102 housed within the bores 50 and 30 of the cutting head and driving shank respectively, and engaging at one end the shoulder 52 and at the other end the shoulder 32 of these members. The engagement of the driving pins 34 with the end wall of the slots 62 serves to prevent the complete separation of the driving shank and head.

As will be apparent, the tool may be used either in connection with a drill press where it will rotate while the work remains stationary, or it may be used in a lathe or other machine tool where it will remain stationary while the work rotates. For simplicity in description, the operation of the tool will be described in connection with the drill press use and the alternative method of operation will be apparent without further description.

Accordingly, the tapered end 14 is first secured within the spindle of the drill press and upon application of power the driving shank and cutting head rotate as a unit. The coil spring 102 maintains these members extended to the limit of the elongated slots 62 in contact with the driving pins 34. Preceding and during the reaming operation the two driving pins are firmly fixed within and drive against the offset portions 64 of the elongated slots, transmitting all downward thrust to the cutting head 12. In this manner, any telescoping or relative axial movement between the cutting head and the driving shank is prevented for the duration of the reaming operation.

The work-piece may be held in any suitable fixture which will serve to maintain it stationary during the cutting operations. Any work-piece which requires the reaming of a plurality of holes of different sizes and the undercutting of a portion of these surfaces can be operated upon. For the purpose of illustration a portion of a pipe fitting requiring such machining has been shown in broken lines in Fig. 2. The fixture preferably has a bushing 104 or other device incorporated therein, as shown in broken lines in Fig. 2. This bushing 104 is preferably provided with an inner guiding surface 106 closely fitting the periphery of cutting head 56 and having an enlarged bore 108 defining a shoulder 110 thereon against which the adjustable stop collar 58 is adapted to abut. The adjustable stop collar 22 on the driving shank is similarly adapted to abut the end face 112 of the bushing.

The compound tool is moved axially by actuation of the drill press spindle toward the work-piece and the reamer performs its cutting operation. Completion of the reaming operation is accomplished when the adjustable stop collar 58 on the cutting head 56 comes in contact with the shoulder 110 of the bushing. Thereupon further reamer cutting action ceases to the extent that radial contact between the driving pins 34 and the offset portion 64 of the slots 62 has been so greatly reduced that the driving pins are no longer maintained in the offset portions of the slots, but start to travel along the elongated portions. This means that the previously existing resistance to telescoping of the cutting head and driving shank has been almost entirely eliminated. Thus, the driving shank carried by the drill press spindle continues its axial movement toward the work-piece at the same rate as before, whereas the cutting head has ceased its movement in this direction. Both members, however, continue to rotate at the same speed during the telescoping movement which now occurs.

The undercutting tool now commences its cutting action. This undercutting tool was in a retracted position during the reaming operation with the cutting edge 92 below the cutting edge 76 of the reamer. Such position of the undercutting tool was due to the extended position of the cutting head relative to the driving shank with the projecting rounded end 95 of the undercutting tool located at the outer end of the tapered bore 26. Now immediately upon the completion of the reaming operation and consequent telescoping of the driving shank and cutting head the rounded projecting end 95 on the undercutting tool commences to travel inwardly along the tapered bore 26. This cam action of the tapered bore 26 on the tool causes a pivoting movement of the undercutting tool on the pivot pin 90 against the pressure of the spring plunger 96. The cutting edge 92 of the undercutting tool consequently is forced from its retracted position into the surface of the previously reamed hole.

The advance of the undercutting tool into the surface of the work-piece must be limited to the point where the exact diameter of the groove is obtained. To this end, the adjustable stop collar 22 on the driving shank is provided and this element will abut the end face 112 of the bushing 104 and prevent further axial movement of the driving shank whereupon further groove cutting action ceases. The undercutting tool 68 will return to the retracted position coincidental with the return of the drill press spindle to the original starting position, causing the driving shank and cutting head to resume the normal extended position. This sequence of operations may be described by stating that the cutting edge 92 of the undercutting tool 68 first withdraws to its normal position inside the recess 86 of the reamer and then the reamer next withdraws completely from the work-piece to a point outside the outer edge of the work-piece.

It will thus be seen that driving the cutting head from the driving shank by way of the driving pins within the offset portions of the elongated slots simultaneously imparts both radial and downward thrust to the cutting head during the reaming operation. It will also be apparent that immediately the resistance due to the cutting action ceases the radial thrust due to this action is almost entirely eliminated and permits the easy withdrawal of the driving pins from the offset portions of the elongated slots. These pins can then travel freely down the elongated slots during the time that the undercutting tool is actuated by the cam action of the tapered bore of the driving shank on the rounded end of this tool.

It is, of course, necessary that the rates of feed of the reamer and undercutting tool to the work-piece be different in order to maintain these tools at their maximum efficiency. This desirable condition has been achieved by the provision of the tapered bore 26 acting as a cam surface on the rounded projecting end 95 of the undercutting tool. The tapered bore 26 acts upon the pivoted blade to translate an outward radial motion to the cutting edge 92 by means of the axial motion of the driving shank actuated by the drill press spindle. The pivot pin 90 acts as a fulcrum between the ends of the undercutting tool and is so positioned relative to the ends as described that it provides a ratio of approximately three to one. A further reduction in ratio of cutting action to axial motion of the driving shank is obtained by forming the tapered bore 26 at an angle of approximately twenty degrees. It has been found by this arrangement that the cutting edge 92 of the undercutting tool has a radial motion into the surface of a work-piece at a rate of speed approximately one-tenth of the rate of relative axial movement between the driving shank and the work-piece. These relative rates of feed can, of course, be varied at will and are set forth herein merely to illustrate the application of the invention to a specific type of work-piece.

It should be understood that in spite of the numerous movements which occur during operation of the tool the entire operation from start to finish of cutting and return consumes approximately seven seconds for a three-quarter inch diameter hole. The variation between the rate of feed for the reaming and the undercutting operations is entirely automatic while the cutting speed remains constant, thus relieving the operator of any necessity of control in the matter. This adaptation of the tools to the work to be performed gives a high rate of productivity to desired degrees of accuracy and finish before the cutting tools need to be removed for sharpening or replacement. When this becomes necessary the separate mounting of these parts permits either tool to be independently removed without difficulty.

I claim:

1. In a compound tool, a driving shank, a cutting head carried by said shank, a cutting tool fixedly secured to said head, a cutting tool pivoted on said head for movement into operative and inoperative positions, a yieldable driving connection between said shank and head providing for relative axial movement therebetween, means associated with said connection for interlocking said shank and head against said relative axial movement when the first said tool is engaged in a cutting operation, said means being rendered ineffective to restrain such movement upon cessation of said operation, and a cam surface on said shank engageable with the pivoted tool upon said relative axial movement of the shank and head for moving said tool radially of said head into operative position to perform a cutting operation.

2. In a compound tool, a driving shank, a cutting head carried by said shank, a cutting tool fixedly secured to said head, a cutting tool pivoted on said head for movement into operative and inoperative positions, a yieldable driving connection between said shank and head including a pin in one and a slot in the other providing limited relative axial movement therebetween, said slot having an offset portion at one end thereof adapted to receive said pin for restraining said relative axial movement when the first said tool is engaged in a cutting operation, said pin being released from the offset portion and thereby rendered ineffective to restrain such movement upon cessation of said operation, and a cam surface on said shank engageable with the pivoted tool upon said relative axial movement of the shank and head for moving said tool radially of said head into operative position to perform a cutting operation.

3. In a compound tool, a driving shank having an axial bore, a cutting head reciprocable within said bore, a cutting tool fixedly secured to said head, a cutting tool pivoted on said head for movement into operative and inoperative positions, a driving connection between said shank and head including a pin in one and a slot in the other providing limited relative axial movement therebetween, said slot having an offset portion at one end thereof adapted to receive said pin for restraining said relative axial movement when the first said tool is engaged in a cutting operation, said pin being released from the offset portion and thereby rendered ineffective to restrain such movement upon cessation of said operation, spring means contained within said bore and acting between the shank and head to urge the latter outwardly from said bore, said pin being thereby normally aligned with the offset portion of the slot, and a cam surface on the wall of said bore engageable with the pivoted tool upon said relative axial movement of the shank and head for moving said tool radially of said head into operative position to perform a cutting operation.

4. A tool for reaming and undercutting a workpiece including a head carrying a reamer and an undercutting tool, a driving member for rotating and reciprocating the head relative to the work-piece, an axially yielding connection between said driving member and head providing telescopic movement therebetween, means for interlocking said driving member and head against said movement during cutting action of said reamer, said means being responsive to said cutting action for maintaining the undercutting tool inoperative, and means operable upon cessation of said cutting action for actuating said undercutting tool in a cutting action during said telescopic movement.

5. A tool for reaming and undercutting a workpiece including a head carrying a reamer and an undercutting tool, said reamer having a recess in one side thereof within which the cutting end of said undercutting tool is housed, a driving member for rotating and reciprocating the head relative to the work-piece, an axially yielding connection between said driving member and head providing telescopic movement therebetween, means for interlocking said driving member and head against said movement during cutting action of the reamer, said means being responsive to said cutting action for maintaining the undercutting tool inoperative, and actuating means for said undercutting tool operable upon cessation of said cutting action for urging the cutting end from the recess into the work-piece during the telescopic movement.

WALTER A. PATSCHEIDER.